(12) United States Patent
Fukuba et al.

(10) Patent No.: US 10,520,223 B2
(45) Date of Patent: Dec. 31, 2019

(54) ROBOTIC HELIOSTAT CALIBRATION SYSTEM AND METHOD

(71) Applicant: SolarCity Corporation, San Mateo, CA (US)

(72) Inventors: Daniel Fukuba, Palo Alto, CA (US); Jos Goble, Santa Clara, CA (US); Salomon Trujillo, Redwood City, CA (US); Thomas Joseph Currier, Rochester, MN (US); Wasiq Bokhari, Half Moon Bay, CA (US)

(73) Assignee: SolarCity Corporation, San Mateo, CA (US)

( * ) Notice: Subject to any disclaimer, the term of this patent is extended or adjusted under 35 U.S.C. 154(b) by 396 days.

(21) Appl. No.: 15/356,433

(22) Filed: Nov. 18, 2016

(65) Prior Publication Data

US 2017/0067668 A1    Mar. 9, 2017

Related U.S. Application Data

(63) Continuation of application No. 13/868,036, filed on Apr. 22, 2013, now Pat. No. 9,506,783, which is a
(Continued)

(51) Int. Cl.
*F24S 40/00* (2018.01)
*F24S 50/00* (2018.01)
(Continued)

(52) U.S. Cl.
CPC ............ *F24S 40/00* (2018.05); *F24S 30/452* (2018.05); *F24S 50/00* (2018.05); *G01D 18/004* (2013.01);
(Continued)

(58) Field of Classification Search
CPC combination set(s) only.
See application file for complete search history.

(56) References Cited

U.S. PATENT DOCUMENTS

| 4,078,798 | A | 3/1978 | Nielsen |
| 4,215,410 | A | 7/1980 | Weslow et al. |

(Continued)

FOREIGN PATENT DOCUMENTS

| CN | 1828173 A | 9/2006 |
| DE | 19615943 A1 | 10/1997 |

(Continued)

OTHER PUBLICATIONS

Non-Final Office Action, U.S. Appl. No. 14/496,497, dated Feb. 1, 2018, 39 pages.
(Continued)

*Primary Examiner* — Mohamed Charioui
(74) *Attorney, Agent, or Firm* — Kilpatrick Townsend & Stockton LLP

(57) ABSTRACT

A robotic controller for autonomous calibration and inspection of two or more solar surfaces wherein the robotic controller includes a drive system to position itself near a solar surface such that onboard sensors may be utilized to gather information about the solar surface. An onboard communication unit relays information to a central processing network, this processor combines new information with stored historical data to calibrate a solar surface and/or to determine its instantaneous health.

18 Claims, 14 Drawing Sheets

Related U.S. Application Data continuation of application No. 13/310,520, filed on Dec. 2, 2011, now Pat. No. 8,442,790, which is a continuation-in-part of application No. 13/182,297, filed on Jul. 13, 2011, now abandoned, and a continuation-in-part of application No. 13/118,274, filed on May 27, 2011, now Pat. No. 8,881,720.

(60) Provisional application No. 61/419,685, filed on Dec. 3, 2010.

(51) Int. Cl.
| | |
|---|---|
| *F24S 30/452* | (2018.01) |
| *G01D 18/00* | (2006.01) |
| *G05D 1/02* | (2006.01) |
| *H02S 50/00* | (2014.01) |
| *H02S 50/15* | (2014.01) |
| *F24S 20/00* | (2018.01) |
| *F24S 50/20* | (2018.01) |
| *F24S 30/00* | (2018.01) |

(52) U.S. Cl.
CPC ......... *G01D 18/008* (2013.01); *G05D 1/0278* (2013.01); *H02S 50/00* (2013.01); *H02S 50/15* (2014.12); *F24S 2020/16* (2018.05); *F24S 2030/134* (2018.05); *F24S 2050/25* (2018.05); *Y02E 10/47* (2013.01); *Y10S 901/01* (2013.01); *Y10S 901/14* (2013.01)

(56) References Cited

U.S. PATENT DOCUMENTS

| | | | |
|---|---|---|---|
| 8,104,893 B2* | 1/2012 | Reznik | G01S 3/7861 |
| | | | 353/3 |
| 8,244,469 B2* | 8/2012 | Cheung | G01S 7/003 |
| | | | 700/248 |
| 2003/0169200 A1 | 9/2003 | Urban et al. | |
| 2005/0034751 A1 | 2/2005 | Gross et al. | |
| 2007/0129847 A1 | 6/2007 | Ulmer et al. | |
| 2008/0059015 A1* | 3/2008 | Whittaker | G05D 1/0274 |
| | | | 701/23 |
| 2008/0308091 A1 | 12/2008 | Corio | |
| 2009/0126774 A1 | 5/2009 | Taylor et al. | |
| 2010/0030417 A1* | 2/2010 | Fang | G05D 1/0274 |
| | | | 701/25 |
| 2010/0101630 A1 | 4/2010 | Kats et al. | |
| 2010/0199972 A1 | 8/2010 | Brost | |

FOREIGN PATENT DOCUMENTS

| | | |
|---|---|---|
| DE | 102006058995 A1 | 6/2008 |
| JP | 2010-058058 A | 3/2010 |
| WO | 2009057677 A1 | 5/2009 |
| WO | 2010025808 A2 | 3/2010 |

OTHER PUBLICATIONS

Office Action for Japanese Application No. 2015-219709, dated Aug. 24, 2016, 11 pages.

First Examination Report for Indian Patent Application No. 4222/CHENP/2013 dated Dec. 21, 2018, 5 pages.

\* cited by examiner

ROBOTIC HELIOSTAT CALIBRATION SYSTEM AND METHOD

CROSS-REFERENCES TO RELATED APPLICATIONS

This application is a continuation of U.S. patent application Ser. No. 13/868,036 filed Apr. 22, 2013, which is a continuation of U.S. patent application Ser. No. 13/310,520 filed Dec. 2, 2011, which claims priority from U.S. provisional application No. 61/419,685, filed Dec. 3, 2010, and also is a continuation in part of U.S. patent application Ser. No. 13/182,297 filed Jul. 13, 2011, and U.S. patent application Ser. No. 13/118,274 filed May 27, 2011, all of which are incorporated by reference herein in their entirety.

FIELD OF THE INVENTION

The present invention relates to solar tracking and calibration devices, and in particular tracking systems for photovoltaic, concentrated photovoltaic, and concentrated solar thermal systems that require constant repositioning to maintain alignment with the sun.

BACKGROUND OF THE INVENTION

In an attempt to reduce the price of solar energy, many developments have been made with respect to lowering the cost of precisely repositioning and calibrating a surface with two degrees of freedom. In concentrated solar thermal systems, heliostat arrays utilize dual axis repositioning mechanisms to redirect sunlight to a central tower by making the normal vector of the heliostat mirror bisect the angle between the current sun position and the target. In order to properly align a heliostat's beam to a target, nine parameters must be defined. Three parameters are needed to define the heliostat's location relative to the receiver target. One parameter is needed to account for tolerances in pan and tilt home positions. One parameter is needed to define mirror-mounting offsets, and an additional parameter is needed to define the non-perpendicularity of the defined axes. Three final parameters are needed to define the heliostat's orientation in a global three-axis reference frame.

One method of defining these nine parameters is to use an over-constrained mathematical system. Precisely aligning a heliostat with this method requires a relatively large number of accurate samples that include information about the heliostat's geometric location and current pan/tilt angles relative to a known angle. The main problem with the current calibration approach is that in order to obtain an accurate and diverse set of samples, each heliostat must be calibrated relative to an accurately positioned sun or light-sensing device. For large heliostats (e.g., >20 m$^2$) this may be accomplished with an attached sun sensor that tracks the sun throughout a day and compares known sun angles to angles measured by the heliostat's encoder system. Field workers must move this sun tracker from heliostat to heliostat until the calibration process is complete. For smaller heliostats this approach is not cost-effective as the reflecting area decreases while the amount of labor required per heliostat remains fixed. Micro-heliostat installers have attempted to solve this problem by placing sun sensors at known geometric locations in a field, and calibrating each heliostat to these sensors. This approach is problematic, as it requires precise installation of calibration towers/sensors and places constraints on heliostat installation flexibility that factor into the fully loaded system cost.

Similarly, calibration of photovoltaics (PVs) and concentrated photovoltaics (CPVs) trackers requires knowledge of the solar surface's orientation in a 3 axis global reference frame relative to a home pan and tilt position.

SUMMARY

A robotic controller for autonomous calibration and inspection of two or more solar surfaces wherein the robotic controller includes a drive system to position itself near a solar surface such that onboard sensors may be utilized to gather information about the solar surface. An onboard communication unit relays information to a central processing network, this processor combines new information with stored historical data to calibrate a solar surface and/or to determine its instantaneous health.

Particular embodiments and applications of the present invention are illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention which is set forth in the claims.

In an embodiment, the mobile robotic controller may discover its position in a global or relative reference frame through the use of an onboard global positioning system or triangulation system.

In a second embodiment, the mobile robotic controller may discover its position in a global or relative reference frame through the use of an external total station, distance sensing system, natural light camera system, or structured light camera system.

In a third embodiment, the mobile robotic controller may use its known position in a global or relative reference frame to determine a solar surface's geometric origin in a global or relative reference frame through the use of an onboard distance sensing system, natural light camera system, or structured light camera system.

In a fourth embodiment, the mobile robotic controller may discover its orientation in a global 3-axis reference frame through the use of an onboard magnetic compass, gyrocompass, solid state compass, accelerometer, inclinometer, magnetometer, gyroscope, or solar sensor.

In a fifth embodiment, the mobile robotic controller may use its known orientation in a global 3-axis reference frame to determine the 3-axis orientation of a solar surface through the use of an onboard distance sensing system, natural light camera system, or structured light camera system.

In a sixth embodiment, the mobile robotic controller may use its known orientation in a global 3-axis reference frame to determine and characterize the non-perpendicularity of a solar surface's pedestal axis through the use of an onboard distance sensing system, natural light camera system, or structured light camera system.

In a seventh embodiment, the mobile robotic controller may use an onboard light detection system in conjunction with a light tube or light guiding system to determine if a solar surface is aligned to the sun.

In an eighth embodiment, the mobile robotic controller may use instantaneous power output information from a PV cell or CPV module to determine if a solar surface is aligned to the sun.

In a ninth embodiment, the mobile robotic controller may utilize an onboard repositionable light source that shines light onto a solar surface in order to dither the power generated by a solar surface. This dither signal may be used to determine the health of a solar surface.

In a tenth embodiment, the mobile robotic controller may use data collected from a multiplicity of solar surfaces to generate a map of the field of solar surfaces. This virtual map may be used to optimize backtracking algorithms.

In an eleventh embodiment, the mobile robotic controller may use a multiplicity of collected data points from a solar surface to characterize manufacturing errors, to determine current and historic system backlash, to characterize field installation tolerances, and to characterize ground settling.

In an thirteenth embodiment, the mobile robotic controller may communicate information gathered about a solar surface with an onboard processing unit, central processing unit, or distributed processing units located on individual solar surfaces or other robotic controllers.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
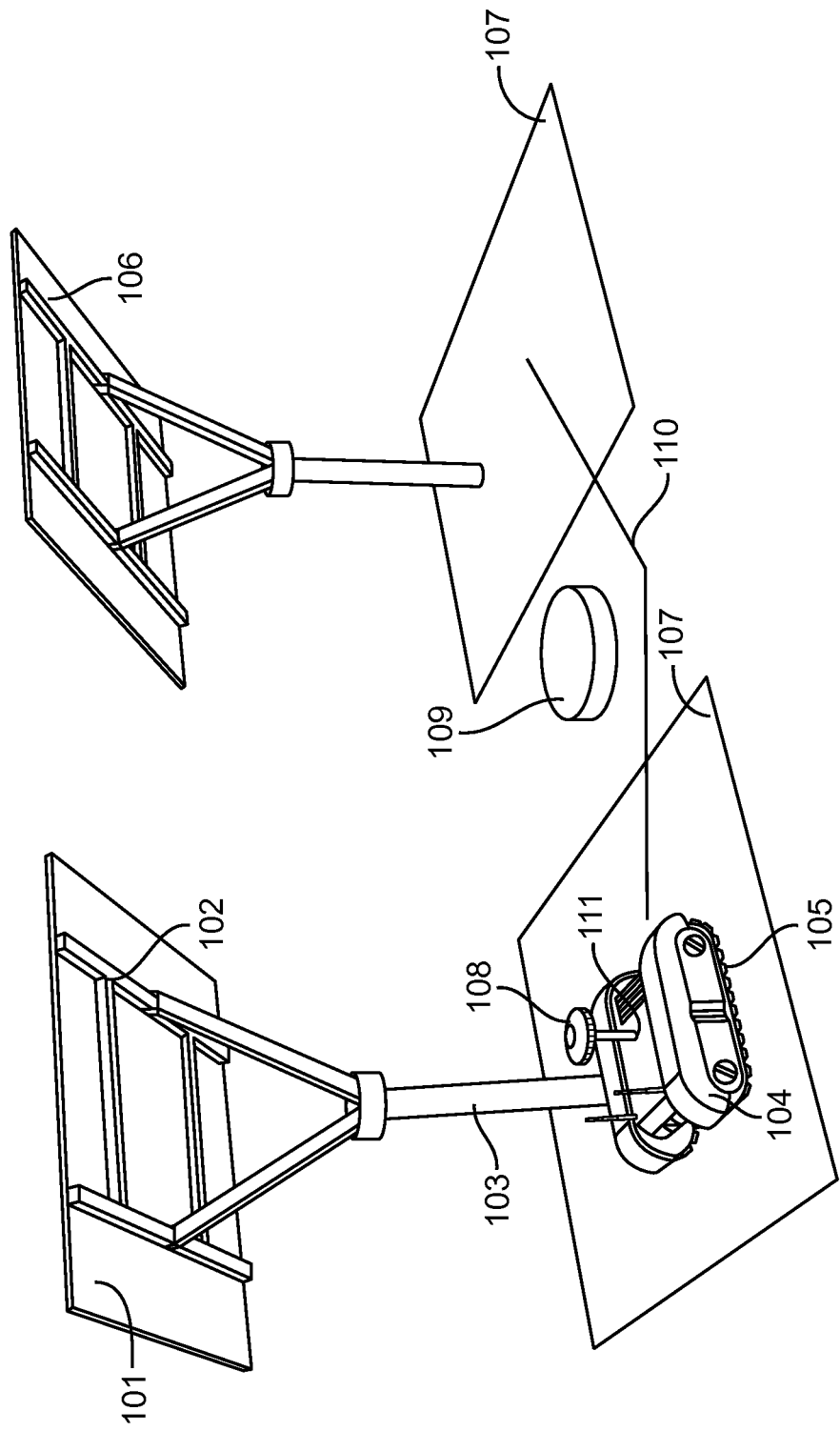
FIG. 1 demonstrates an embodiment of a robotic controller that is capable of determining its position in a field of solar surfaces using onboard components.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product that can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

Referring now to the drawings, FIG. 1 demonstrates an embodiment of a robotic controller that is capable of determining its position in a field of solar surfaces using onboard components. A robotic controller may be repositioned near a first (101) and second solar surface (106). Methods of achieving this motion include, but are not limited to; an external system or collection of systems that physically move the robotic controller in an unstructured environment, an external system or collection of systems that physically move the robotic controller in a structured environment, an onboard system or collection of systems that enable the robot to move itself autonomously in an unstructured environment, an onboard system or collection of systems that enable the robot to move itself autonomously in a structured environment, a combination of onboard and external systems that enable the robot to move itself autonomously in an unstructured environment, and a combination of onboard and external systems that enable the robot to move itself autonomously in a structured environment. FIGS. 1-14 assume that the robotic controller is capable of using an onboard collection of sensors and electromechanical systems to move itself autonomously in an unstructured environment. Prior disclosures, notably U.S. provisional application No. 61/364,729 filed on Jul. 15, 2010, U.S. provisional application No. 61/419,685 filed on Dec. 3, 2010, U.S. utility application Ser. No. 13/118,274, and U.S. utility application Ser. No. 13/182,297, describe methods of autonomously repositioning a robotic controller in a structured or unstructured environment in more detail.

In order to achieve autonomous outdoor position sensing and navigation using only onboard components in an unstructured environment, a robotic controller may be equipped with a flight system and system of flight controls such that it does not have to encounter ground based obstacles. A ground based robotic controller must include a collection of systems capable of navigating through a) 3-dimensional terrain; b) changes in surface density; c) weather exigencies and d) instability of the sensed environment. One existing method of achieving these goals is for the robotic controller to: a) map the terrain with 3-D vision systems, b) compute safe and unsafe areas on the terrain within this field of vision, c) compute optimal paths across the safe area towards the desired destination, d) activate a drive mechanism, which may include drive motors, wheels, and associated electronics, e) repeat this cycle until the destination is reached, or there is no known path to the destination. A notable obstacle the robotic controller (104) may recognize is a solar surface (101), its supporting structure system (102), and its supporting foundation (103).

An embodiment of the robotic controller will now be described. It includes a drive mechanism (105) to move itself between a first solar surface (101) and a second solar surface (106). The drive mechanism utilizes a multiplicity of wheels connected to an electric drive motor to propel the robotic chassis over sections of terrain separating solar surface calibration stations (107) where station is defined as a general area near a first or second solar surface. The robotic controller may utilize a battery-based power unit to provide electrical energy to the drive motor and to other enable electronic functions. An onboard 3-D vision system (108) may use a structured or natural light based camera system to recognize unique solar surfaces or ground obstacles (109). An onboard microprocessor system may be used to compute safe drive areas, an optimal drive path (110), and may send commands to the drive system's electric motors to execute the optimal drive path.

A robotic controller may include an onboard position location system (111) that is capable of determining the location of a robotic controller in global coordinates. During operation, the onboard position location system may constantly update its position in global (X, Y, Z) coordinates. This system may be made functional through the use of a GPS device or triangulation system that is able to communicate with a multiplicity of devices calibrated in a global reference frame. In a triangulation system, three triangulation receivers/transmitters may communicate with a system onboard the robotic controller. In one embodiment, the mobile triangulation system measures the time delay between signals to determine the raw distance to each triangulation transmitter. These signals may be optical, electromagnetic, or audible. If the geometric location of these three transmitters is known, the triangulation device will be able to determine its relative or global position in a field of solar surfaces. A robotic controller may also use a 3-D vision system (108) and SLAM algorithms to determine its relative position in a field of solar surfaces.

Figure 2:
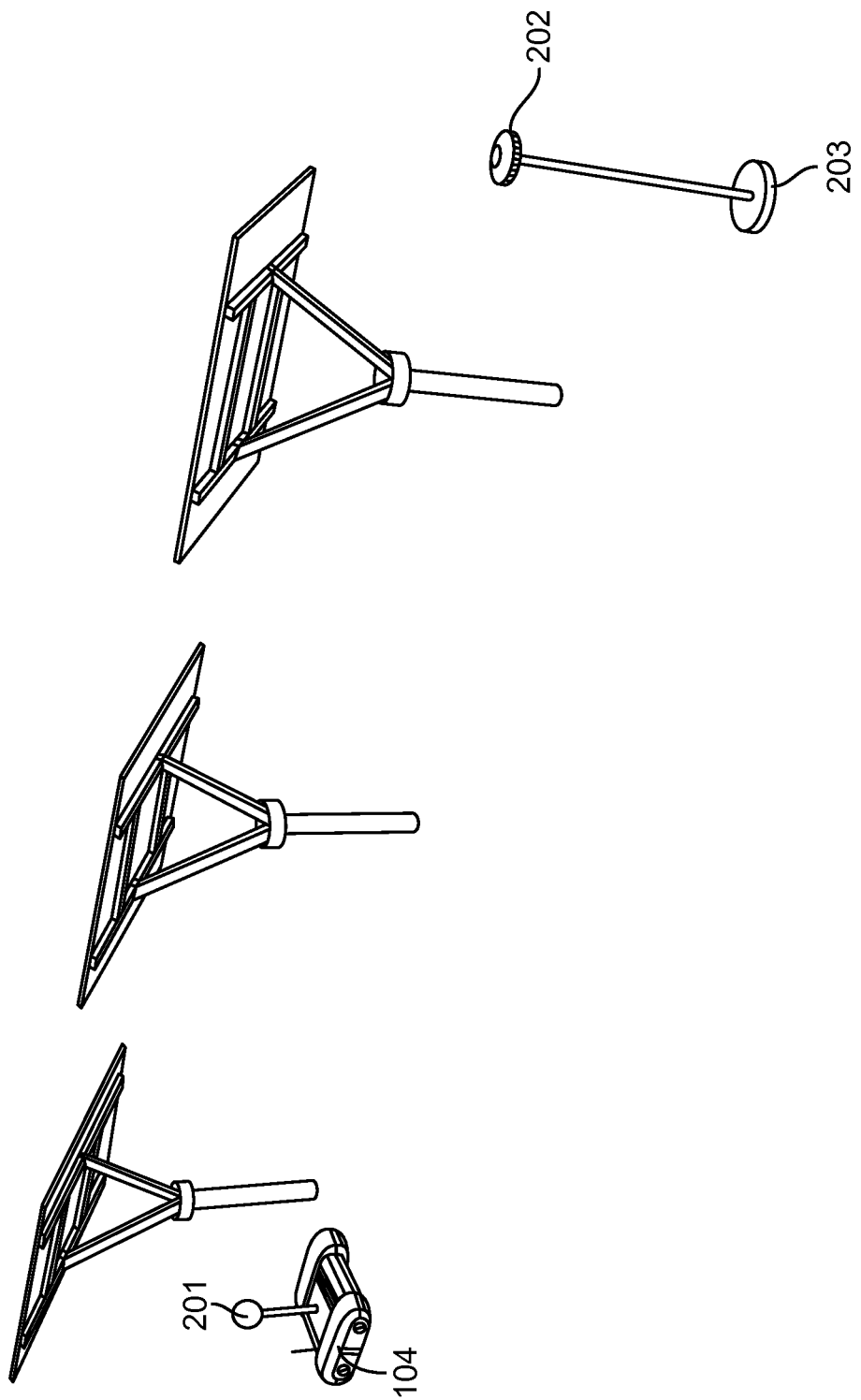
FIG. 2 demonstrates an embodiment of a robotic controller that is capable of determining its position in a field of solar surfaces using onboard components in conjunction with calibrated in-field sensors.

FIG. 2 demonstrates an embodiment of a robotic controller that is capable of determining its position in a field of solar surfaces using onboard components in conjunction with calibrated in-field sensors that serve as a minimally structured environment. In an embodiment, the robotic controller may include an onboard target (201) that corresponds with an autonomous total station (202). In this configuration, the total station is placed at a known location (203), and the robot (104) automatically moves a retro reflective target (201) throughout the installation field. The total station is capable of measuring the distance to the retro reflective target and communicates the target's relative position to the mobile robotic controller (104). Other systems and/or methods for sensing position include, but are not limited to: utilizing a distance sensing system onboard the robotic controller that is able to determine its distance to a multiplicity of calibrated towers or targets, utilizing one or more natural light based camera or cameras to determine distance to calibrated targets or towers, or utilizing a structured light based position sensing techniques.

In systems where the robotic controller's environment is sufficiently constrained, this data may be used to assist the robot in determining its position in a field of solar surfaces. For example, if the robotic controller travels along a rigid line structure, it may use a multiplicity of position readings to fit all position points to an approximate line using a least squares method.

Figure 3:
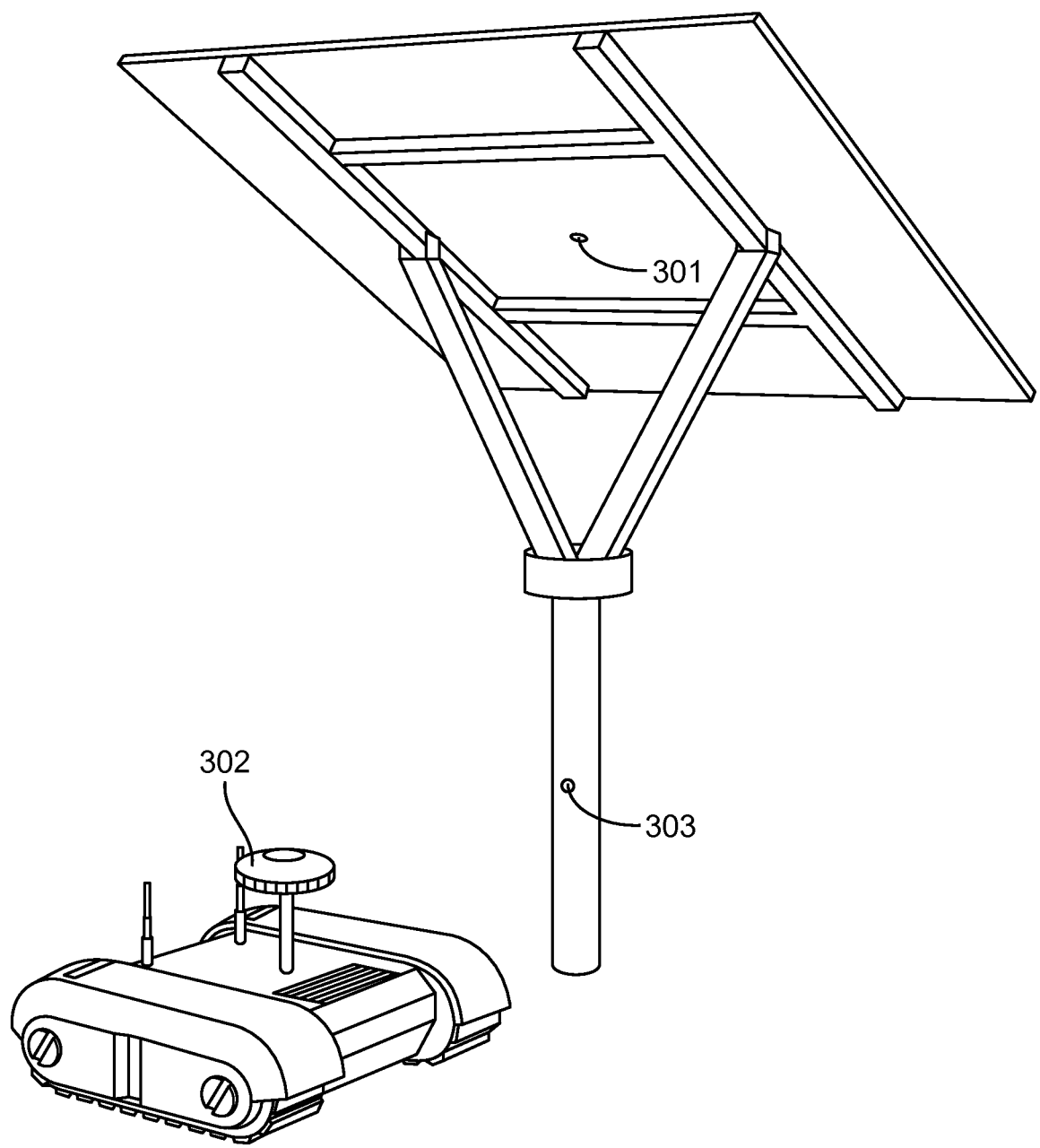
FIG. 3 demonstrates one method a robotic controller may use to discover the distance to a heliostat or solar tracker's geometric origin.

FIG. 3 demonstrates one system a robotic controller may use to discover the distance to a heliostat or solar tracker's geometric origin. A solar surface's geometric origin (301) may be defined as the point about which the surface pivots. A structured light camera system (302), that comprises a structured light emitter and sensor, may be used to sense the distance, in X, Y, Z coordinates, from the robotic controller to a solar surface's geometric origin (301) or to a mark (303) on the solar surface's support structure (102) or foundation (103). This mark may have a pre-defined offset to the geometric origin. By determining its distance to this point, a robotic controller may then approximate its distance to a solar surface's origin by applying a pre-defined geometric offset.

Other systems that could be used by the robotic controller to accomplish a similar objective include, but are not limited to; utilizing a natural light based camera or system of cameras, utilizing a laser distance sensor or sensors, utilizing a physical probing system, or by utilizing a system capable of detecting a signal emitted by the solar surface or by a point on its supporting structure or supporting foundation. A mark (303) or group of marks on an individual solar surface may include, but are not limited to a retro-reflective target, a color coded target, a unique physical feature of the solar surface or its supporting structure, or a signal emitting device that emits a magnetic, electromagnetic, or audible signal.

If the robotic controller's environment is more constrained, this information may be used to assist the robot in determining the distance to a solar surface's geometric origin. As an example, if the robotic controller is constrained to a geometric line with a known offset from a solar surface's geometric origin (301), the robotic controller will only have to compute its offset in one dimension as the other two dimensions can be assumed.

Figure 4:
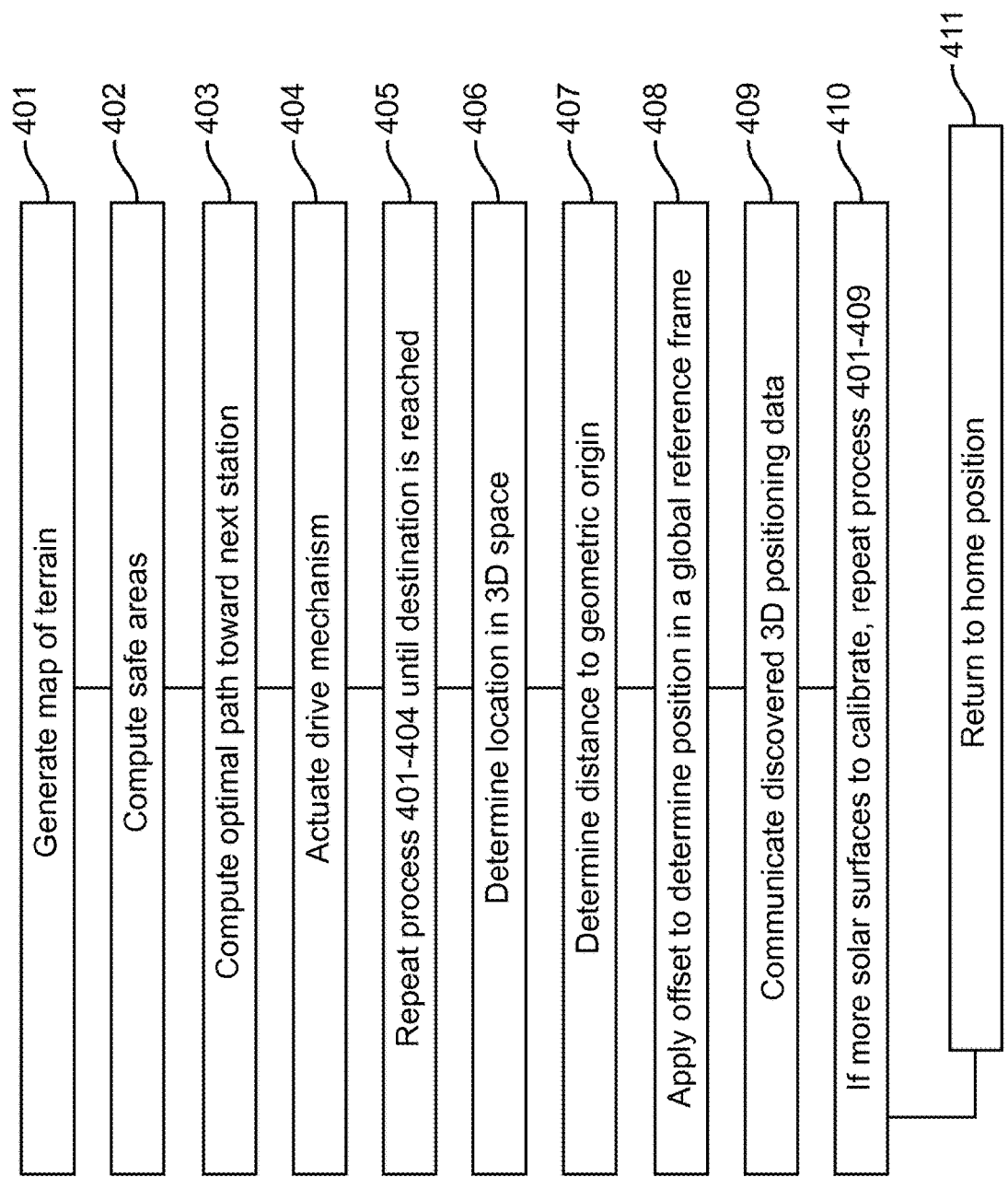
FIG. 4 demonstrates a process a robotic controller may use to determine the location of an individual solar surface.

FIG. 4 demonstrates a process a robotic controller may use to determine the location in global or relative coordinates of two or more individually controlled solar surfaces. This process combines methods and processes outlined in FIGS. 1-3.

The calibration process begins with step 401, generating a 3-D map of surroundings. This map enables the robotic controller to compute safe and unsafe areas in the terrain (402). The robotic controller is equipped with a station sensing system that may detect distance to individual solar surfaces and this information, combined with computed safe areas, can be used to compute the optimal path to the next station or calibration zone (403). In an embodiment, the robotic controller has one or more onboard cameras that are able to detect key features on individual heliostats. Other embodiments include but are not limited to: each heliostat emitting a signal that is intercepted by a device on the calibration robot that measures signal attenuation, equipping the robot with a SONAR or LiDAR based system in order to map and analyze surroundings, utilizing a time of flight based 3-D scanning system, or utilizing a laser distance sensor system in combination with a retro-reflective target strategically placed on a solar surface or its supporting structure.

In step 404, the robotic controller activates its drive mechanism to move towards a station or calibration zone. While moving between stations, the station sensing mechanism may be used to continually update the optimal drive path to the drive mechanism (405) until the destination is reached. In this example, the destination is defined by the robotic controller being within range to calibrate a solar surface. Process steps 401-405 are similar for drive mechanisms that utilize wheels, caterpillar tracks, moveable legs, articulating joints, or a chain drive to reposition the robotic controller. In alternative embodiments, drive systems can use a track, cable, or rail based mechanisms to reposition the controller between stations. The robotic controller may communicate with an external drive or set of drives to perform this repositioning.

In step 406, the robotic controller may access an onboard position location mechanism to discover its absolute or relative position in 3D space. As outlined in FIGS. 1-2, this may be accomplished with a real-time kinematic global positioning system that discovers position information at high accuracy in a global reference frame. Other methods of determining position in 3D space include but are not limited to: a standard global positioning system, triangulation from known sensors emitting sound or light, sensors on the robot measuring distance to known locations, a camera based system recognizing patterns at various distances, or communicating with a manual or automatic total station surveying system.

After a robotic controller enters a calibration zone and determines its position and in a global reference frame (406), it uses a distance-sensing mechanism and/or known geometry to discover the absolute distance, in X, Y, Z coordinates, to a solar surface's geometric origin (407). The robotic controller can apply this origin offset to its known position to compute the geometric location of a solar surface in a global reference frame (408). For example, if a robotic controller identifies itself at a global position of X=4000, Y=4000, and Z=4000 and recognizes that a heliostat's origin point is at distance of X=1, Y=2, and Z=3 from the calibration robot's reference point, it would calibrate the solar surface's origin point at X=4001, Y=4002, and Z=4003 in a global reference frame.

The calibration robot may then communicate positioning data about an individual solar surface (409) to an onboard data storage unit, a central communications system, or a distributed communications system. In an embodiment, the calibration robot includes a wireless transmitter. Other embodiments for transmitting data include but are not limited to: wireless communication to individual solar surfaces, wireless communication to a group of solar surfaces or central controller, direct data link to individual solar surfaces, direct data link for a multiplicity of solar surfaces or central controller, data transfer through the calibration robot's power supply, or by wirelessly writing calibration data to a storage medium or RFID chip.

After the calibration process is complete (steps 401-409), the calibration robot determines if there are more solar surfaces to calibrate (410). If more solar surfaces need to be calibrated, the process repeats with step 401. If all heliostats have been calibrated, the robotic controller may return to its home or docking position (411). This dock may include a recharging station or a data link to store information or to communicate calibration data to a central controller.

Figure 5:
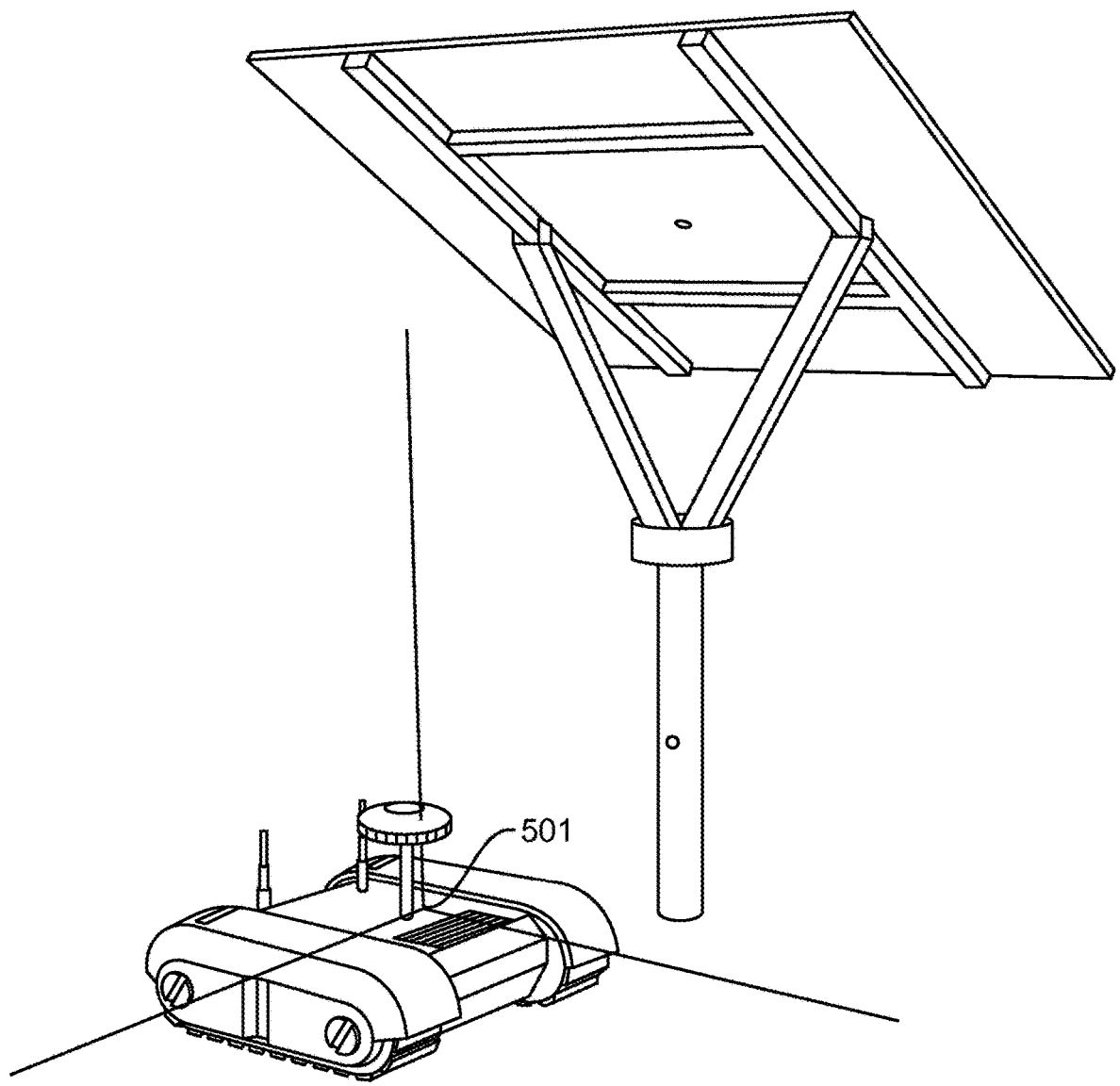
FIG. 5 demonstrates an embodiment of a robotic controller that is capable of determining its orientation in a global 3-axis reference frame.

FIG. 5 demonstrates an embodiment of a robotic controller (104) that is capable of determining its orientation in a global 3-axis reference frame (501). In this embodiment, the robot utilizes an onboard accelerometer to determine orientation relative to gravity and a magnetic compass to determine orientation relative to the earth's magnetic poles. Other methods of properly calibrating the robot to a global reference frame include but are not limited to: an onboard gyrocompass, solid state compass, GPS compass, inclinometer, magnetometer, gyroscope, or a solar sensor. A solar sensor could be used to determine a robotic controller's orientation relative to the instantaneous solar vector. By determining the current time, and combining this information with approximate GPS coordinates, a robotic controller would be able to map its orientation relative to the sun to a global 3-axis reference frame (501).

Figure 6:
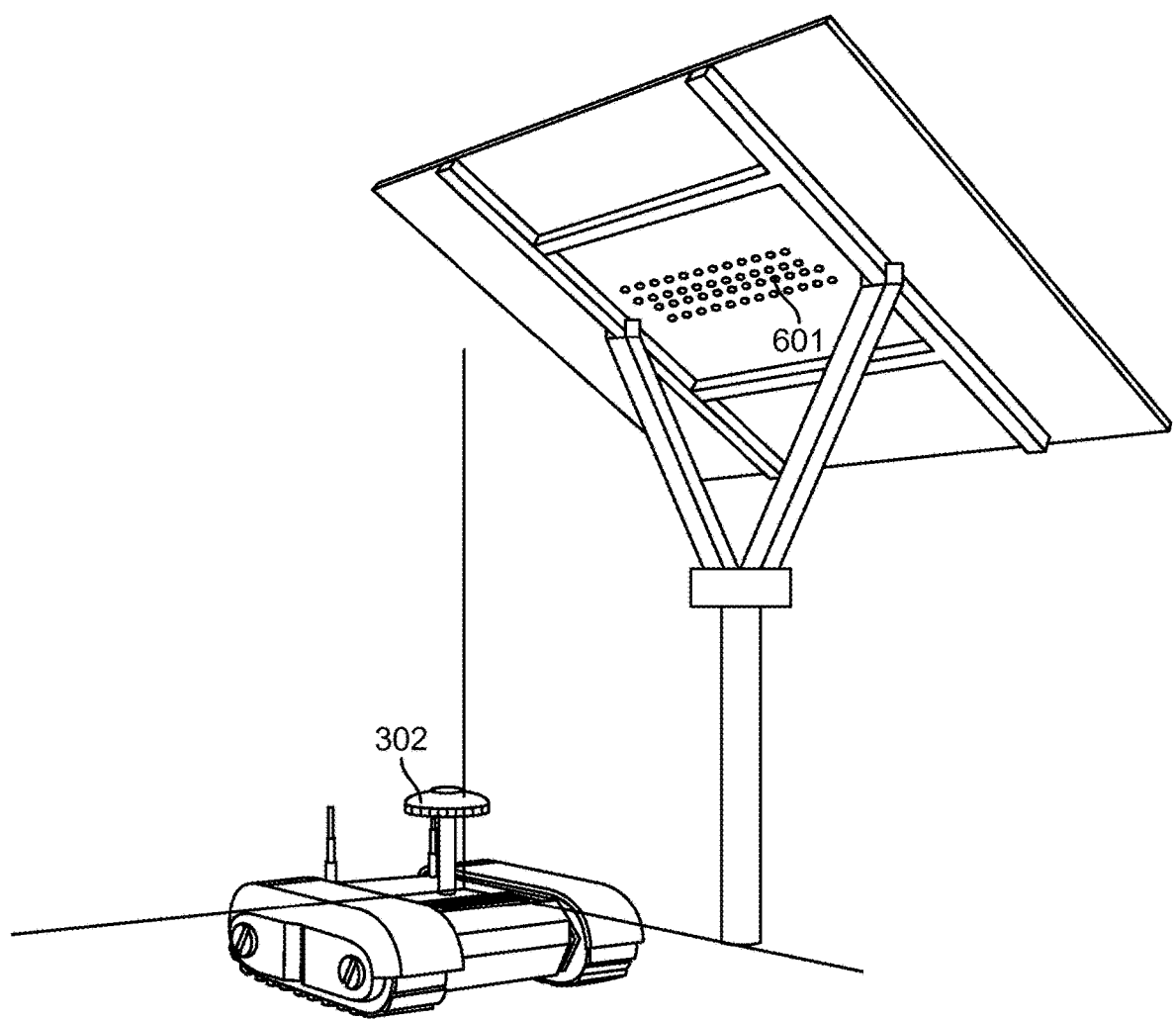
FIG. 6 demonstrates one method a robotic controller may use to discover the relative 3-axis orientation of a solar surface and its vertical pedestal axis.

FIG. 6 demonstrates one method a robotic controller may use to discover the relative 3-axis orientation of a solar surface and its vertical pedestal axis. In this method, a structured light camera system (302) that comprises a structured light emitter and sensor may be used to sense the relative orientation of a solar surface (101) and its vertical pedestal axis (103). This camera system may be static, or dynamic to increase the effective field of view. The structured light emitter may project a pattern of dots (601) onto the solar surface (101), its supporting structure (102), and its supporting foundation (103). Information obtained from a sensor or camera able to detect this structured light pattern can be used to detect features and to fit these features to a geometric plane.

A solar surface repositioning system may also include features that assist a mobile robotic controller in this orientation discovery process. These features include, but are limited to: retro-reflective targets placed in pre-defined patterns, a color coded target, a unique physical feature of the solar surface or its supporting structure, or a signal emitting device that emits an electromagnetic or audible signal.

Other methods of determining a solar surface's orientation relative to a robotic controller include, but are not limited to: utilizing pre-defined or discovered geometry, utilizing a natural light based camera, utilizing a light or sound based distance sensing system, or utilizing a probing system that interacts with physical elements of the solar surface or detects magnetic, electromagnetic, or audible signals emitted by known locations on the solar surface. This probing system could also be used to place an inclinometer on or near a solar surface's vertical pedestal axis to directly compute its non-perpendicularity.

Figure 7:
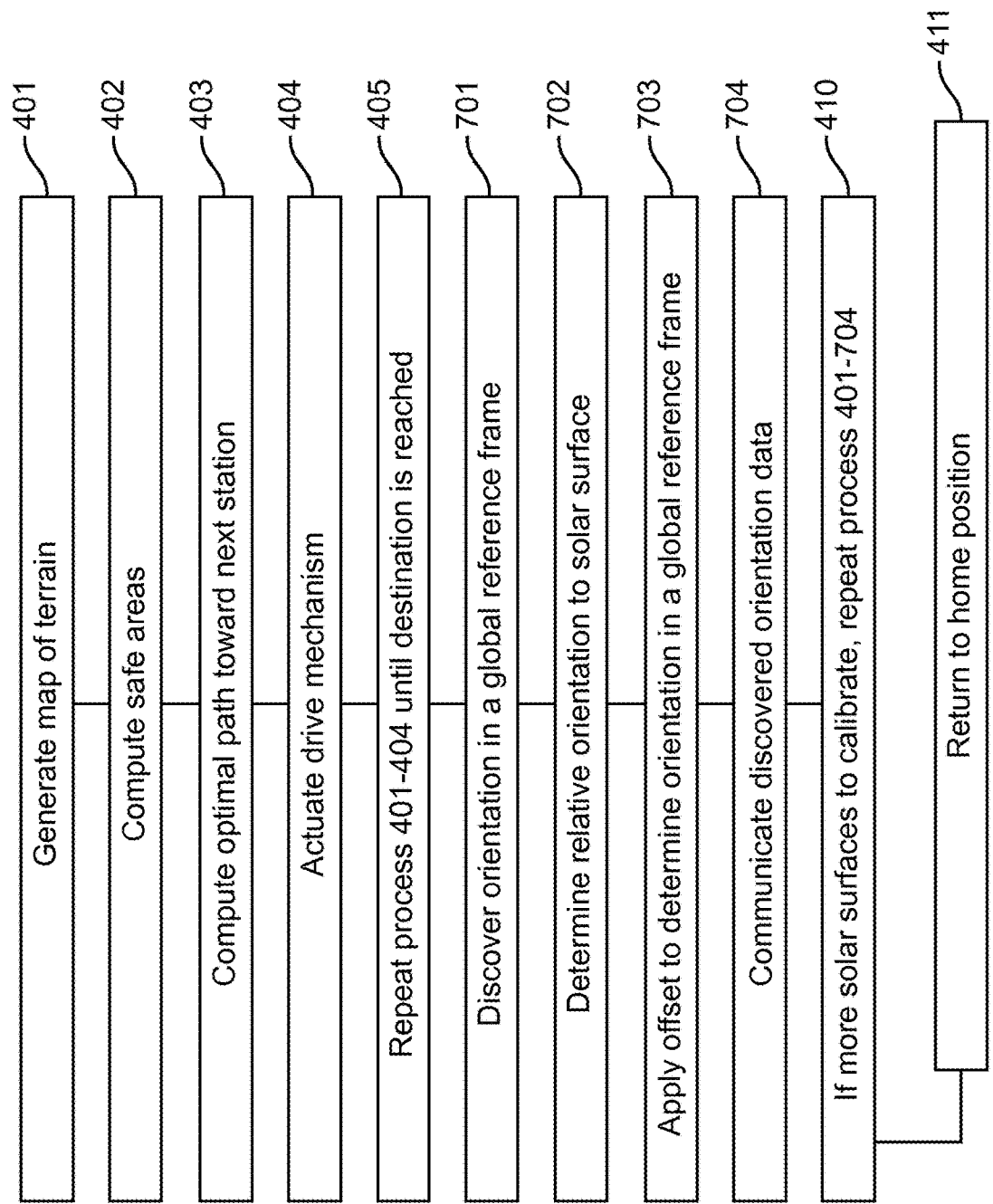
FIG. 7 demonstrates a process a robotic controller may use to determine the orientation of a solar surface in a global 3-axis reference frame.

FIG. 7 demonstrates a process a robotic controller may use to determine the orientation of a solar surface in a global 3-axis reference frame. This process begins with steps 401-405 as outlined in detail in FIG. 4. In step 701, the robotic controller may access an onboard orientation discovery mechanism to discover its orientation in a global reference frame. As outlined in FIGS. 5-6 this may be accomplished with an onboard accelerometer and compass that orients the calibration robot with respect to a global reference frame.

The robotic controller's processing unit may now request information from onboard sensors that are used to determine the relative orientation of a solar surface (702). This information may then be mapped to a global reference frame (703) by projecting a solar surface's relative orientation onto the robot's discovered global orientation. The calibration robot may then communicate orientation data about an individual solar surface (704) to an onboard data storage unit, a central communications system, or a distributed communications system.

After the calibration process is complete, the calibration robot determines if there are more solar surfaces to calibrate (410). If more solar surfaces need to be calibrated, the process repeats with step 401. If all heliostats have been calibrated, the robotic controller may return to its home or docking position (411).

Figure 8:
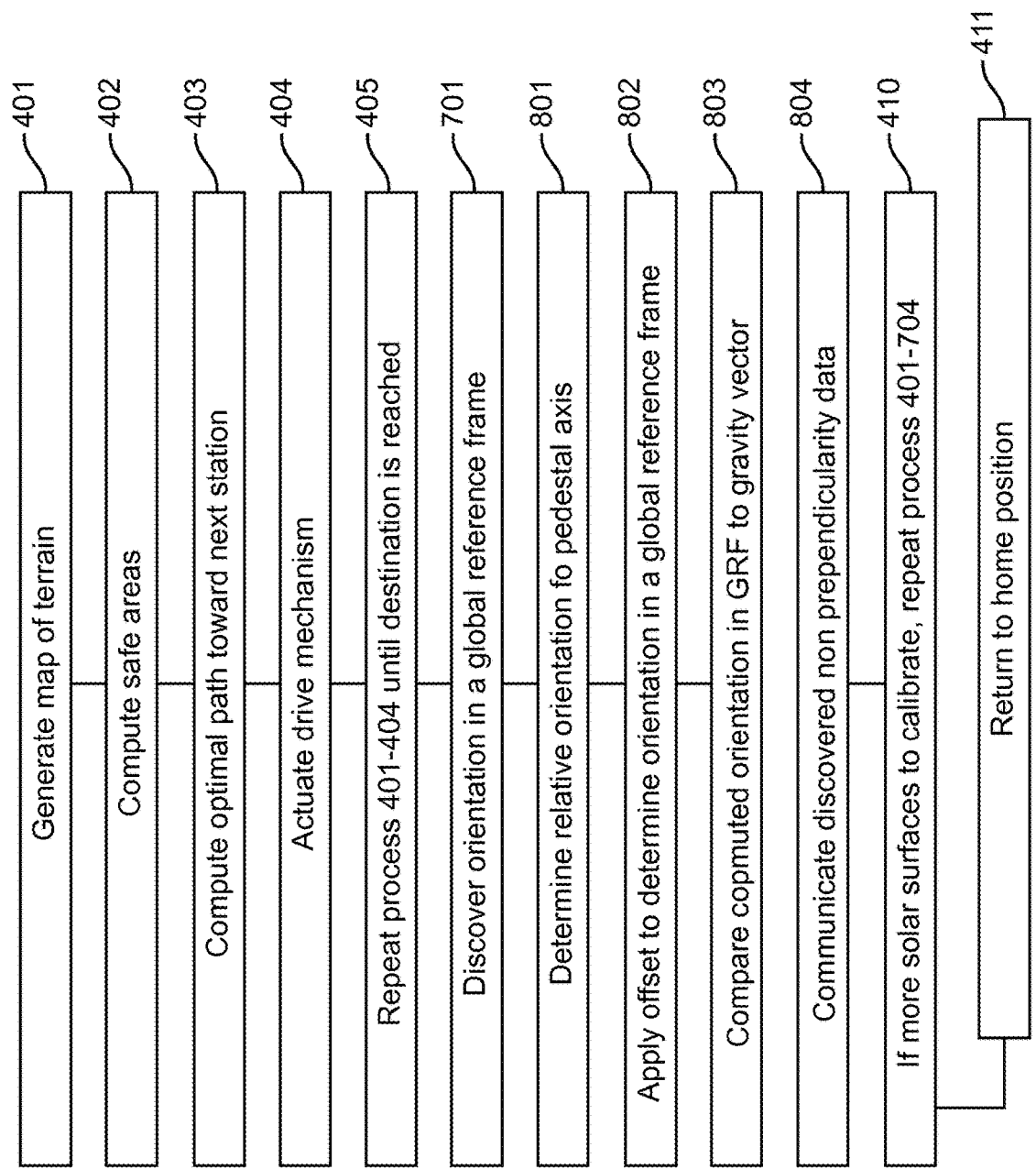
FIG. 8 demonstrates a process a robotic controller may use to characterize the non-perpendicularity of a solar surface's supporting pedestal axis.

FIG. 8 demonstrates a process a robotic controller may use to characterize the non-perpendicularity of a heliostat's pedestal axis using a perpendicularity unit within the robotic controller, this perpendicularity unit can take the form of a software algorithm, for example. This process begins with steps 401-405 as outlined in detail in FIG. 4 and step 701 as outlined in FIG. 7. The robotic controller's processing unit may now request information from onboard sensors that are used to determine the relative orientation of a solar surface's pedestal axis (801). This information may then be mapped to a global reference frame (802) by projecting a pedestal axes relative orientation onto the robot's discovered global orientation. As a final step in the calibration process, the robotic controller will compare the offset of the discovered global orientation to a known or approximated gravitational vector to compute the non-perpendicularity of the solar surface's pedestal axis (803).

The calibration robot may then communicate the non-perpendicularity of a solar surface's foundation or pedestal axis (804) to an onboard data storage unit, a central communications system, or a distributed communications system. After the calibration process is complete, the calibration robot determines if there are more solar surfaces to calibrate (410). If more solar surfaces need to be calibrated, the process repeats with step 401. If all heliostats have been calibrated, the robotic controller may return to its home or docking position (411).

Figure 9:
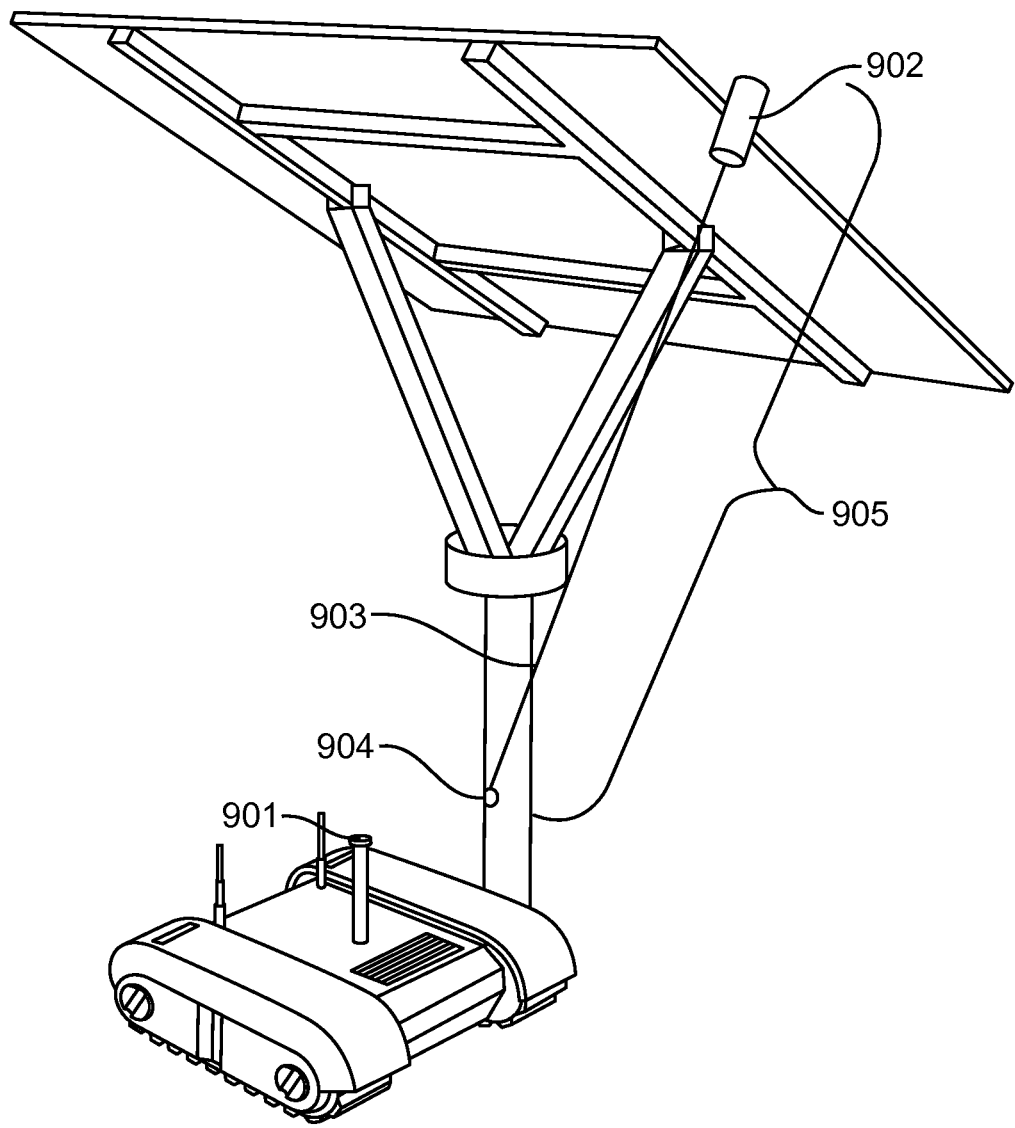
FIG. 9 demonstrates a light guide system that may be used by a robotic controller to determine if a solar surface is currently oriented toward the sun.

FIG. 9 demonstrates a light guide system that may be used by a robotic controller to determine if a solar surface is currently oriented toward the sun. An embodiment of this system requires that robotic controller be equipped with a light sensing device (901). This device is able to sense the output of a light guide system (905) that comprises a narrow band optic (902), a fiber optic cable (903), and an optional light scattering optic (904). The narrow band optic prevents off-axis direct sunlight from entering the fiber optic cable, and has sensitivity to a solar half angle range that can be predefined or adjusted as needed. The purpose of the fiber optic cable is to enable better access to the data, namely the light output or lack thereof, coming from the narrow band optic as the cable may be routed as needed. The light scattering optic may enable even better access to this data and eliminate the need for a robotic controller's light sensing device (901) to be placed near to the end of the fiber optic cable.

The purpose of this system is to determine if a solar surface is currently on sun. This information may be used as a closed loop calibration technique in conjunction with a search algorithm that simultaneously adjusts the position of a solar surface while monitoring a robotic controller's light sensing device (901). It may also be used to determine the orientation of a solar surface in a global reference frame by utilizing approximate global position and an internal clock to compute the current solar vector.

Figure 10:
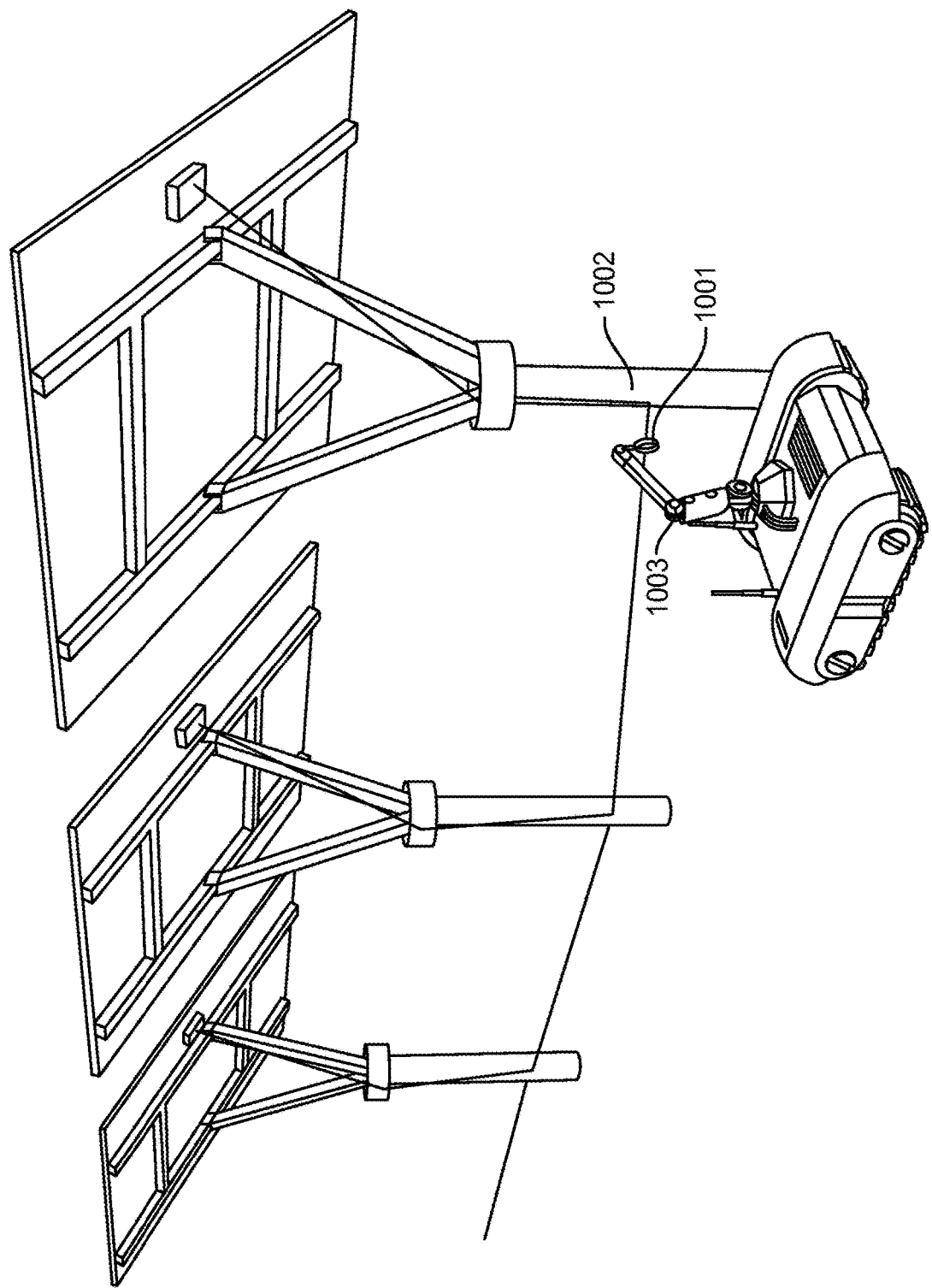
FIG. 10 demonstrates one embodiment of a current monitoring system that may be used by a robotic controller to determine the instantaneous output of a PV cell or CPV module.

FIG. 10 demonstrates one embodiment of a current monitoring system that may be used by a robotic controller to determine the instantaneous output of a PV cell or CPV module. This purpose of this system is to determine if a solar surface is aligned to the sun. As outlined in FIG. 9, this information is useful when used in a closed loop calibration technique or to determine the orientation of a solar surface in a global reference frame. The current monitoring system (1001) is primarily useful for PV and CPV applications as it does not require any new system pieces, but could also be used in heliostat applications. The system is able to determine the instantaneous output of a photovoltaic or concentrated photovoltaic system on an inverter, string, or individual panel level through a variety of sensing techniques. These techniques include, but are not limited to indirect current sensing by measuring the magnetic field generated by a wire (1002) or loop of wire with a probing hall effect sensor (1003), direct current sensing by physically plugging in a voltage and/or current meter into a photovoltaic system, or by connecting to an external metering device that is capable of communicating instantaneous current output information to a robotic controller (104).

Figure 11:
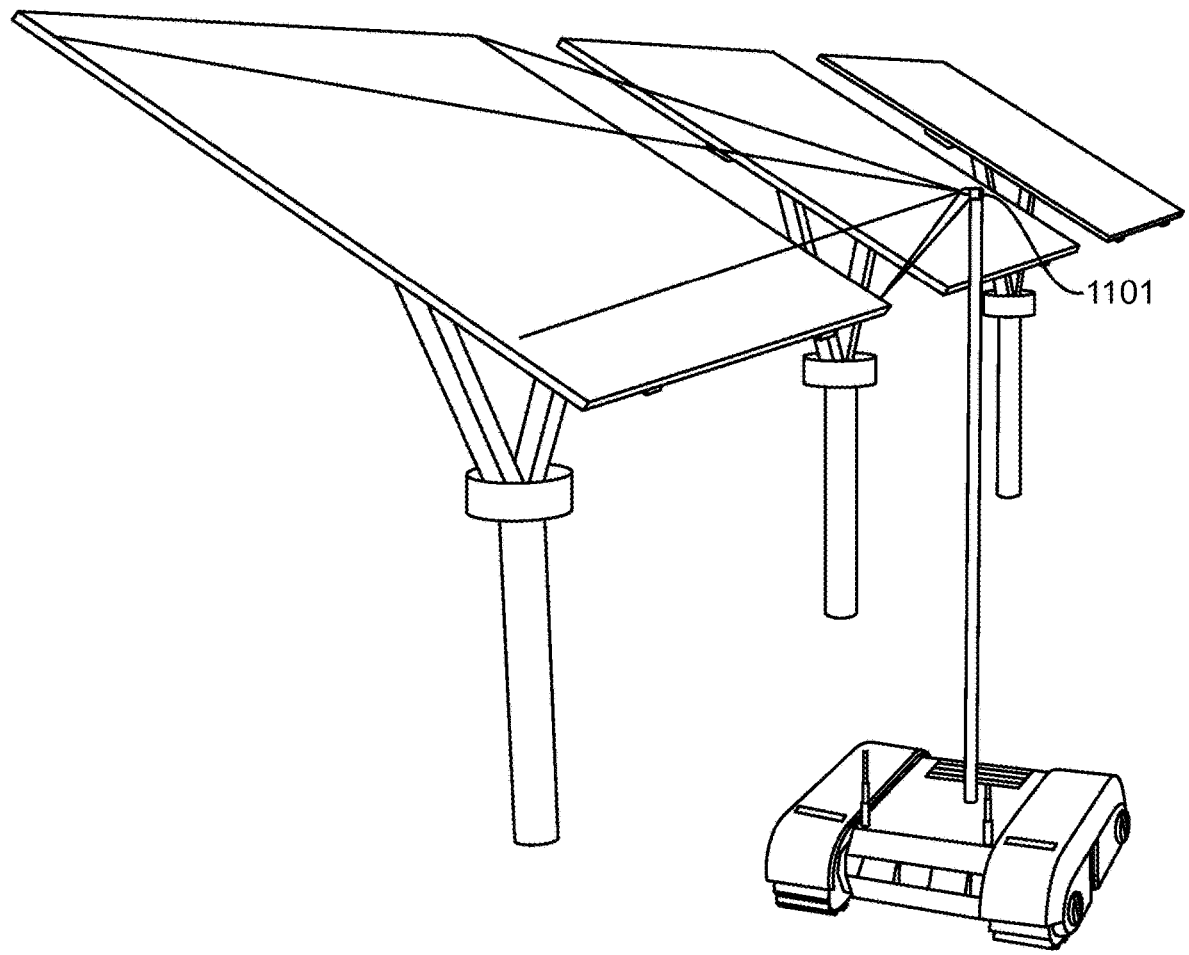
FIG. 11 demonstrates one embodiment of a light modulation system that may be used by a robotic controller to dither the amount of light striking a solar surface.

FIG. 11 demonstrates one embodiment of a light modulation system that may be used by a robotic controller to dither the amount of light striking a solar surface. One purpose of this system is to determine the status or overall health of an individual solar surface by measuring the system's output while simultaneously modulating the amount of artificial or natural light striking the solar surface. If no power output change is detected at a system level while one statistically significant piece of the solar power system is effectively turned on/off, it may be assumed that aforementioned solar surface is dysfunctional.

One method of achieving this dithering effect will now be described. The system uses an onboard directional light emission device (1101) to increase the amount of light striking a solar surface (101). When the light emission device is turned off, the amount of light striking a solar surface decreases. The system may be used during daylight hours, though the modulation signal is more statistically significant at nighttime when a system's baseline power output is approximately zero.

Figure 12:
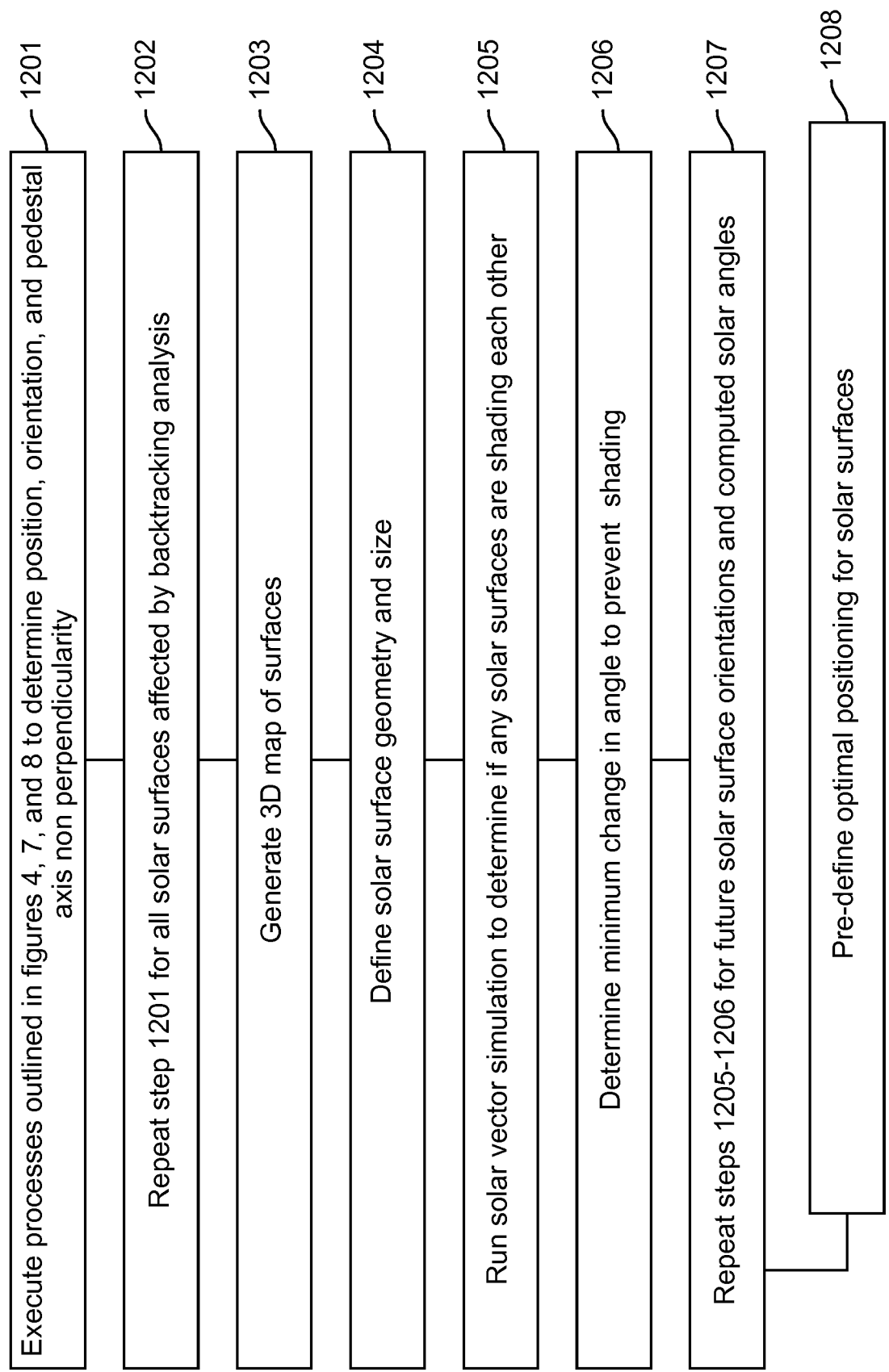
FIG. 12 demonstrates a process a robotic controller may use to optimize field level backtracking algorithms.

FIG. 12 demonstrates a process a robotic controller may use to optimize field level backtracking algorithms. Backtracking algorithms are only applicable to non-concentrating PV applications as they require a solar surface to be pointed away from the solar vector in order to prevent shading. Shading an area of a PV module can produce a disproportional power loss.

This process begins with executing the processes described in FIGS. 4, 7, and 8 to determine the current position, orientation, and non-perpendicularity of an individual solar surface and its pedestal axis (1201). Process 1201 is then repeated for every solar surface that may be affected by a backtracking analysis (1202). These groups of solar surfaces may be pre-defined or pre-programmed. The robotic controller may also be used to determine or discover safe zones wherein safe zones are defined as places where it would be impossible, given a known or discovered field configuration, for a first solar surface to shade a second solar surface.

The collected information is then used to generate a 3D map of a field of solar surfaces (1203). In order to determine if solar surfaces are currently a) shading each other or b) have the capacity to shade each other, the geometry and area of the solar surfaces must be defined. A robotic controller may use onboard vision systems to detect geometry and area for an individual solar surface, or this information may be defined by a human operator (1204). To determine if a solar surface is shading an adjacent solar surface, a directional light simulating the solar vector may be applied to the generated 3D map of solar surfaces (1205), If shading is detected, a computational system may determine the minimum amount of change needed to a first solar surface's orientation to prevent it from shading a second solar surface (1206). This computational process may be repeated for future orientations of solar surfaces (1207) and future solar vector angles to pre-determine the optimal positioning for individual solar surfaces in a field of solar surfaces (1208).

Figure 13:
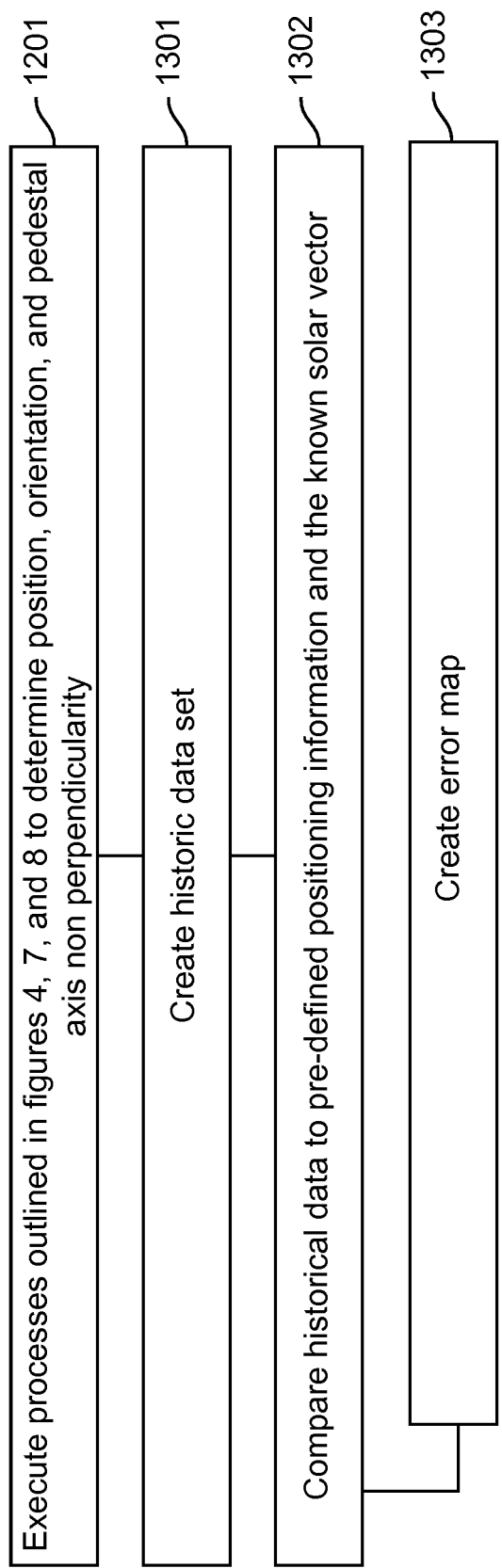
FIG. 13 demonstrates a process a robotic controller may use to characterize field installation tolerances, manufacturing errors, backlash, and ground settling over time.

FIG. 13 demonstrates a process a robotic controller may use to characterize field installation tolerances, manufacturing errors, backlash, and ground settling over time. These errors that arise from imperfections in the manufacturing and installation processes may be defined by comparing a set of historic data points containing information about the measured orientation and/or position of a solar surface to its predicted orientation and/or position if no errors existed. This process may begin with executing processes described in FIGS. 4, 7, and 8 to determine the current position, orientation, and non-perpendicularity of an individual solar surface and its pedestal axis (1201). Process 1201 is then repeated for a solar surface to create a historic data set (1301). In step 1302, a solar surface's estimated orientation and the known solar vector are also recorded. A computational system may then compare measured, predicted, and known data to create an error map against solar positioning and against a solar surface's predicted orientation (1303). This error detection process may be used to detect solar surfaces that fall out of an acceptable range of error. This error map may also be used to fine tune sun tracking or backtracking control algorithms by effectively closing the calibration loop.

Figure 14:
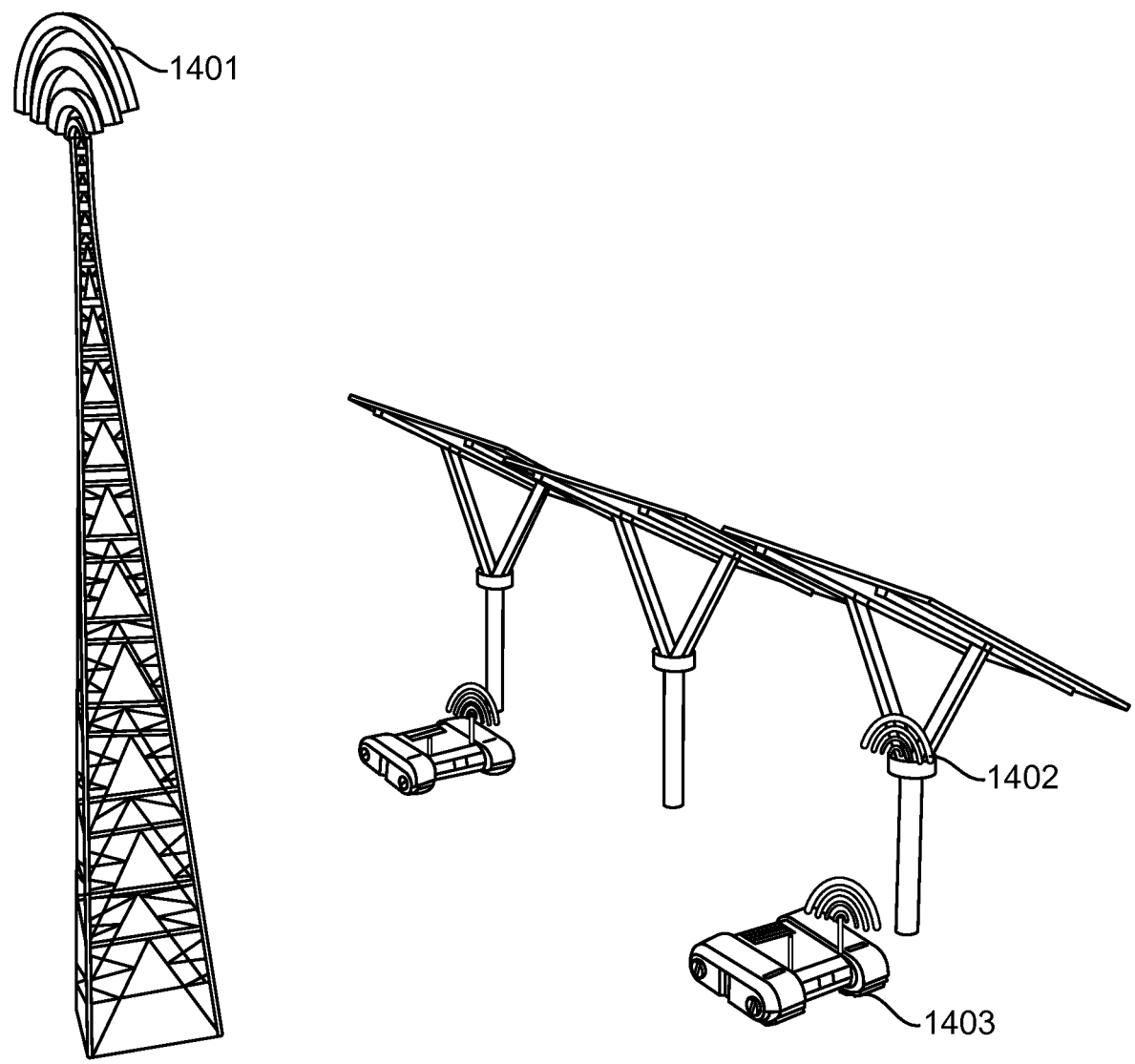
FIG. 14 demonstrates an embodiment of a robotic controller that is capable of communicating raw or processed data to an onboard processing unit, central processing unit, distributed processing units, or with other robotic controllers.

FIG. 14 demonstrates an embodiment of a robotic controller (104) that is capable of communicating raw or processed data to an onboard processing unit, central processing unit (1401), distributed processing units (1402), or with other robotic controllers (1403). In alternate embodiments, a robotic controller can communicate with and receive information from the one or more solar surfaces even when the robotic controller is are not adjacent to the one or more solar surfaces.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:
1. A robot, comprising:
a flight system configured to maneuver the robot above ground-based obstacles and characterize an unstructured environment suitable for supporting an array of photovoltaic modules, the robot being configured to:
map terrain in the unstructured environment with a 3-D vision system;
compute safe and unsafe areas on the terrain in the unstructured environment;

identify known obstacles within the terrain in the unstructured environment, and determine a current position, orientation and non-perpendicularity of one or more solar surfaces distributed across the terrain; and compare the current position, orientation and non-perpendicularity of the one or more solar surfaces to a historical position, orientation and non-perpendicularity of the one or more solar surfaces to determine one or more of field installation tolerances, manufacturing errors and ground settling.

2. The robot of claim 1, wherein the known obstacles include one or more of the following: a solar surface; a supporting structure system for the solar surface; and a supporting foundation for the supporting structure system.

3. The robot of claim 1, wherein computing safe and unsafe areas comprises identifying optimal drive paths that lead to desired destinations in the unstructured environment.

4. The robot of claim 1, further comprising:
an onboard position location system capable of determining the location of the robot in global coordinates.

5. The robot of claim 4, wherein the onboard position location system comprises a triangulation system able to communicate with a multiplicity of devices calibrated in a global reference frame.

6. The robot of claim 4, wherein the onboard position location system is a GPS device.

7. The robot of claim 1, further comprising:
a calibration unit configured to determine calibration information for adjustable solar surfaces distributed across the unstructured environment.

8. The robot of claim 7, wherein the calibration unit includes a perpendicularity unit to determine a perpendicularity measure of support structures supporting the adjustable solar surfaces based on orientation of the robot and orientation of the support structure relative to the orientation of the robot, wherein the status information identified for the adjustable surface comprises the orientation of the support structure relative to the robot.

9. The robot of claim 8, wherein the perpendicularity unit comprises a software program.

10. The robot of claim 8, wherein computing safe and unsafe areas on the terrain in the unstructured environment comprises determining safe zones where, given a known field configuration, a solar surface would not be able to shade an adjacent solar surface.

11. A method for mapping terrain in an unstructured environment suitable for supporting a field of solar surfaces, the method comprising:
maneuvering a robot having a flight control system and a 3-D vision system above ground-based obstacles to characterize the unstructured environment;
mapping terrain in the unstructured environment using the 3-D vision system;
computing safe and unsafe areas on the terrain in the unstructured environment;
identifying known obstacles within the terrain in the unstructured environment; and determining a current position, orientation and non-perpendicularity of one or more solar surfaces distributed across the terrain; and comparing the current position, orientation and non-perpendicularity of the one or more solar surfaces to a historical position, orientation and non-perpendicularity of the one or more solar surfaces to determine one or more of field installation tolerances, manufacturing errors and ground settling.

12. The method of claim 11, wherein determining the current position, orientation and non-perpendicularity of the one or more solar surfaces comprises using a position location system on-board the robot to determine the current position, orientation and non-perpendicularity of the solar surfaces.

13. The method of claim 11, further comprising determining an alignment value for one or more of the solar surfaces, the alignment value describing reorientation of the one or more solar surfaces to an optimal solar vector.

14. The method of claim 11, wherein mapping the terrain comprises mapping a plurality of solar surfaces distributed across the unstructured environment.

15. The method of claim 14, further comprising adjusting the orientation of one or more of the solar surfaces using the mapped terrain data.

16. A robot, comprising:
a flight system configured to maneuver the robot through the air above ground-based obstacles and characterize an unstructured environment suitable for supporting an array of photovoltaic modules, the robot being configured to:
map terrain in the unstructured environment with a 3-D vision system,
compute safe and unsafe areas on the terrain in the unstructured environment,
identify known obstacles within the terrain in the unstructured environment, and
determine a current position, orientation and non-perpendicularity of one or more solar surfaces distributed across the terrain; and
compare the current position, orientation and non-perpendicularity of the one or more solar surfaces to a historical position, orientation and non-perpendicularity of the one or more solar surfaces to determine one or more of field installation tolerances, manufacturing errors and ground settling; and
a transmitter configured to transmit the safe and unsafe areas as well as the identified obstacles to a receiver external to the robot.

17. The robot of claim 16, wherein the receiver external to the robot comprises one or more adjustable solar surfaces distributed within the unstructured environment.

18. The robot of claim 17, wherein the robot further comprises a natural light camera or a distance sensing system.

* * * * *